Aug. 18, 1931.  A. LAFAYETTE  1,819,562
FUMIGATOR FOR FRUIT AND OTHER CARS
Filed Sept. 17, 1928   3 Sheets-Sheet 1
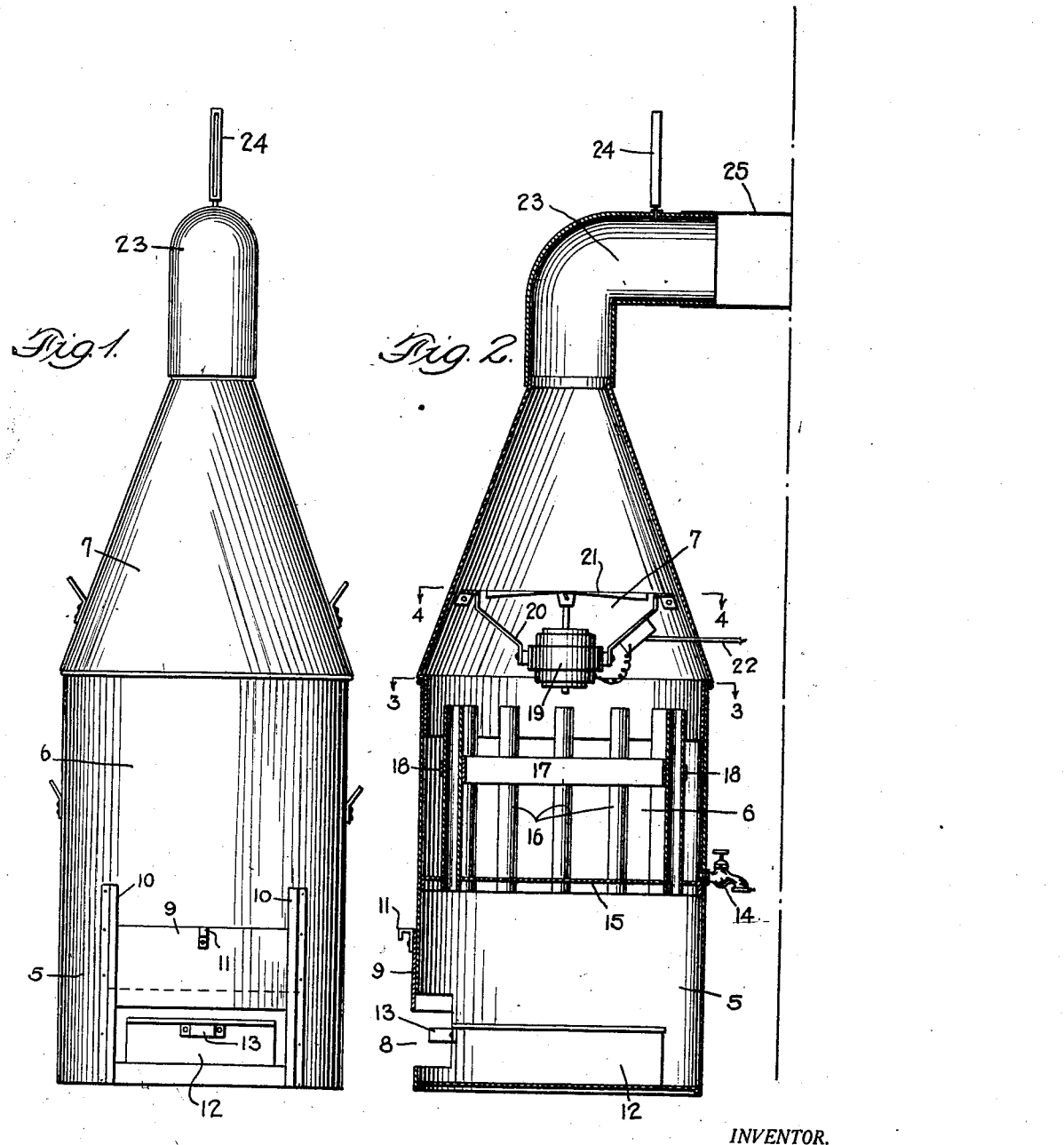
INVENTOR.
Arthur LaFayette
BY
Edwin S. Clarkson
ATTORNEY.

Aug. 18, 1931.  A. LAFAYETTE  1,819,562
FUMIGATOR FOR FRUIT AND OTHER CARS
Filed Sept. 17, 1928    3 Sheets-Sheet 2

INVENTOR.
Arthur La Fayette
Edwin S. Clarkson
ATTORNEY.

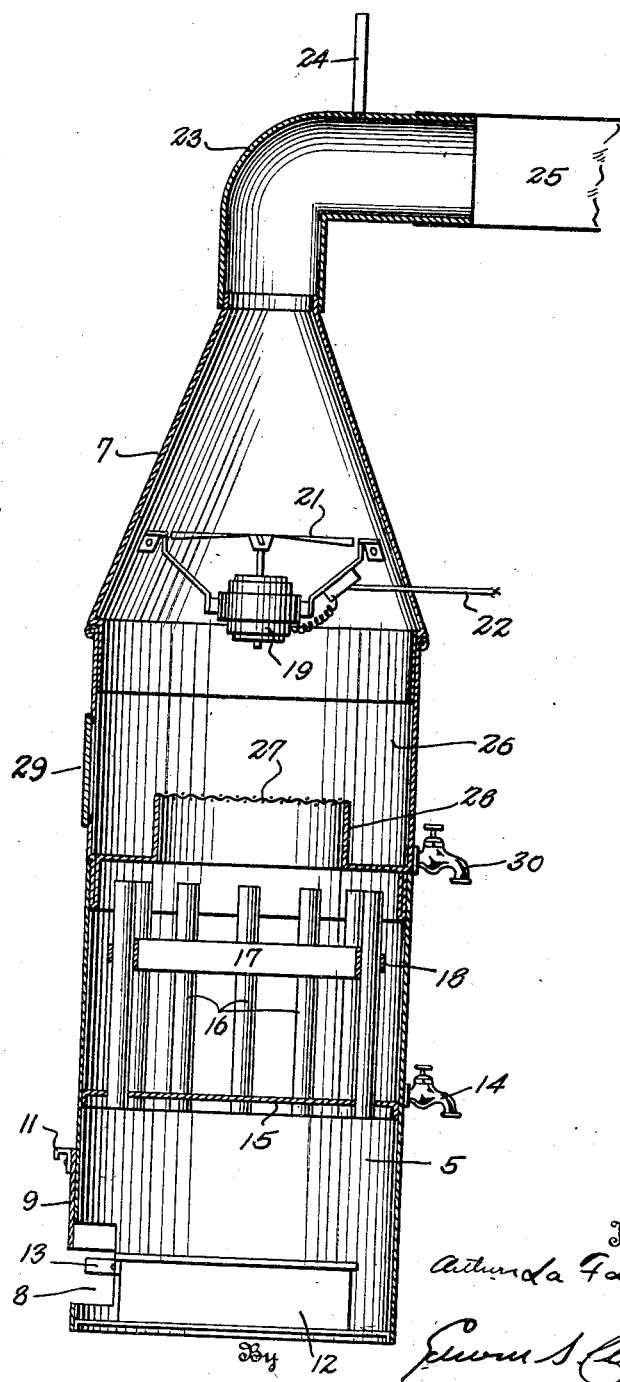

Patented Aug. 18, 1931

1,819,562

UNITED STATES PATENT OFFICE

ARTHUR LAFAYETTE, OF DINUBA, CALIFORNIA

FUMIGATOR FOR FRUIT AND OTHER CARS

Application filed September 17, 1928. Serial No. 306,601.

My improved machine is especially designed for use by shippers of perishable and semi-perishable fruits and vegetables, to insure delivery of such fruits and vegetables in the markets of the consumer in almost as perfect condition as that in which it left the hands of the grower.

This machine is so designed that the fumes of burning sulphur are properly distributed throughout the entire car load of fruit, and also is forced to every part of the car in equal amounts, one part not given too much and another slighted as is often the case when burning sulphur is used direct.

The sulphur fumes are also precooled by being forced through pipes which are cooled with melting ice mixed with salt which has a tendency to lower the temperature of the fruit in the car rather than raise same, which occurs if sulphur is burned openly in the car.

To date nothing has been discovered so far as I am aware that so readily arrest mould and decay in fruit or vegetables as burning sulphur and at the same time leaving no taste that the most delicate palate can detect, and furthermore no ill effects come from eating as is often the case when other preservatives are used.

However, in the past the application of these burning fumes have been made in the most crude fashion, by placing in the loaded car of fruit a vessel of burning sulphur, and allowing the fumes to percolate through the car as best it might without proper distribution, which damages the fruit in the proximity of the container.

My machine is not only beneficial to fruit while in transit, but can be used with wonderful results to growing crops when the weather is not sufficiently warm to fume sulphur.

In the drawings

Figure 1 is a front elevation of my improved fumigator.

Figure 2 is a vertical central section of Figure 1.

Figure 5 is a vertical central section of my fumigator with two cooling chambers.

Figure 3:
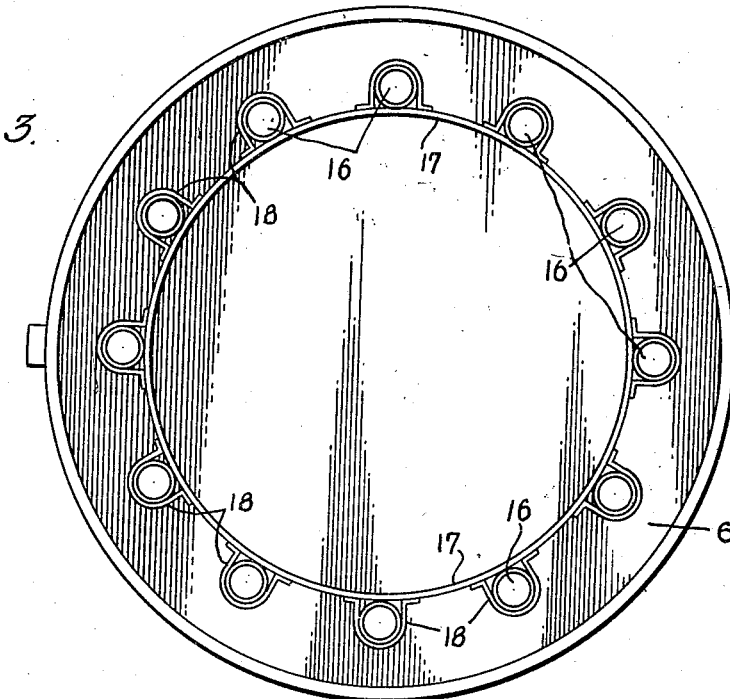
Figure 3 is a section on the line 3—3, Figure 3, looking in the direction of the arrows.
Figure 4:
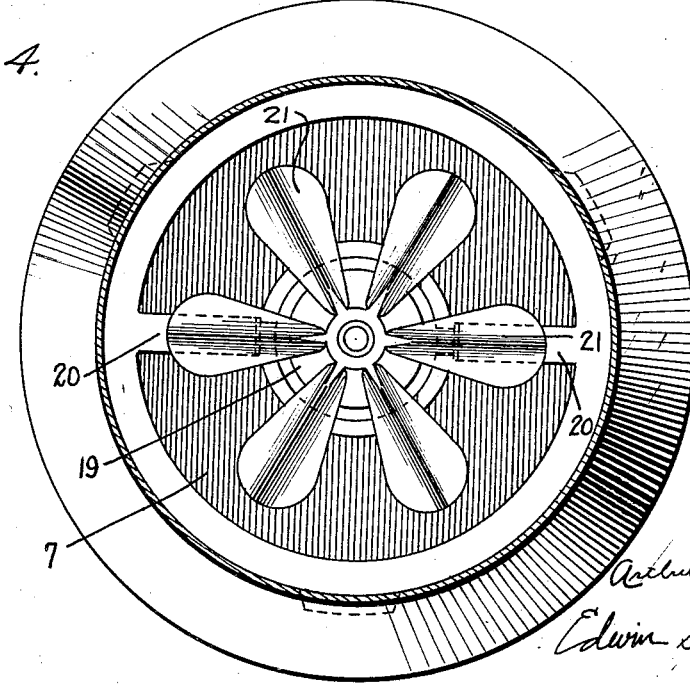
Figure 4 is a sectional view on the line 4—4, Figure 2, looking in the direction of the arrows.

My improved car fumigator is divided into three chambers, the fumigation chamber 5, the cooling chamber 6, and the suction chamber 7.

The fumigating chamber 5 is provided with an opening 8 near the bottom in its side wall, which may be securely closed by a door 9 moving in slideways 10, said door having a lift handle 11. In this chamber 5 I position a pan 12 having a handle 13, said pan being adapted to receive and hold sulphur or other suitable fumigant, said sulphur being burned in the pan.

The cooling chamber 6 is water tight and is provided with a drain cock 14, the bottom wall 15 of the cooling chamber being provided with holes in which the lower ends of the pipes or conduits 16 are soldered, the lower end portion of the pipes, preferably, extending below the bottom wall 15 as shown in Figure 2. These pipes are connected to a ring 17 by means of the straps 18 at predetermined intervals throughout the circumference of the ring, as best seen in Figure 3, and their upper ends terminate above the predetermined water level in the cooling chamber.

In my preferred construction, as shown in Figure 5, I provide a cooling chamber 26 immediately above and in open communication with the cooling chamber 6 into which the pipes 16 discharge. In this chamber 26 I provide a removable sieve 27 mounted on a rim 28, said sieve preventing ice in chamber 26 from falling through to chamber 6, while the rim 28 functions as a dam for the collection of water from the melting ice and thus prevents the water in chamber 26 from dripping into the pipes 16 of chamber 6. The chamber 26 may be provided with a door 29 and a drain 30.

In some instances I may omit the cooling chamber 26 and construct the device as shown in Figures 1 and 2.

The suction chamber 7 is provided with a motor 19 suspended in a suitable bracket 20, a suction fan 21 being connected to the motor 19 in the usual manner, the fan being connected to the electric conductor 22 in the usual manner. Where electricity is not available a gas engine may be used.

The fumigators may be made in various sizes.

The stack 23 is provided with a thermometer 24.

My fumigator is set outside of and a suitable distance from the car to be fumigated and a hose, or other suitable pipe 25 extends from the end of the stack 23 through an opening in a temporary door fitted in the doorway of the car, which temporary door is removed after the contents of the car have been properly fumigated and the regular car door is immediately thereafter closed.

After the fruit or other products have been loaded in the car and the temporary car door in position with the hose 25 secured thereto my fumigator is put into action and the fumes of sulphur from the chamber 5 are sucked up through the pipes 16 by the fan 21, and are forced into the car and properly distributed throughout the entire car load of fruit, and are also forced to every part of the car in equal amounts. As the fumes are sucked through the pipes 16 in the cooling chamber and through chamber 26 they are precooled by the cooling medium in the chambers, which has a tendency to lower the temperature of the fruit in the car rather than raise the same, which raising of temperature occurs if sulphur is burned openly in the car.

It has been found that the second cooling chamber 26 also functions as a cleanser for the fumes as they come in direct contact with the ice.

What I claim is:

1. A fumigator comprising a casing, a combustion chamber at the base of the casing, cooling and suction chambers arranged in the casing above the combustion chamber in successive order and in superposed relation to each other, a horizontal partition between the combustion and cooling chambers, conducting tubes extending at their lower ends downwardly through said partition and secured thereto and projecting upwardly from the partition into the cooling chamber to a point near the top thereof so as to connect the combustion chamber with the suction chamber for the upward flow of fumes from the former to the latter through said tubes, means engaging the tubes at or near their upper ends for connecting and maintaining them in spaced relationship, an outlet at the top of the casing leading from the suction chamber, and means supported by the casing in said suction chamber for drawing fumes upwardly thereinto through said conducting tubes and discharging the fumes through said outlet.

2. A fumigator comprising a casing, a combustion chamber at the base of the casing, cooling and suction chambers arranged in the casing above the combustion chamber and in superposed relation to each other, a conical stack communicating with the cooling chamber, a partition between the combustion and cooling chambers, a group of separate and independent conductors supported by the partition and communicating at their lower ends with the combustion chamber and at their upper ends with the top of the cooling chamber for conducting fumes from the combustion chamber upwardly into and through the cooling chamber for flow from the latter to the stack, and a suction and discharge device supported within the top of the casing and from the walls of the stack and operating to draw the fumes from the combustion chamber through said conductors and into the stack and to discharge the fumes from said stack.

3. A fumigator comprising a casing having a combustion chamber at the bottom thereof and an outlet at the top thereof, a pair of cooling chambers arranged in successive order in said casing above said combustion chamber, a partition between the combustion chamber and lower cooling chamber, a partition between the cooling chambers having an opening therein, conducting tubes extending at their lower ends into the combustion chamber through the first-named partition and thence upwardly through the lower cooling chamber and terminating at their upper ends below the second-named partition, an annular dam wall surrounding the opening in the upper partition and extending therefrom upwardly into the upper cooling chamber, a suction chamber communicating with the upper cooling chamber, and means for drawing fumes into the suction chamber through the cooling chambers from the combustion chamber and discharging the fumes from the suction chamber.

4. A fumigator comprising a casing having a combustion chamber at the bottom thereof and an outlet at the top thereof, a pair of cooling chambers arranged in successive order in said casing above said combustion chamber, a partition between the combustion chamber and lower cooling chamber, a partition between the cooling chambers having an opening therein, conducting tubes extending at their lower ends into the combustion chamber through the first-named partition and thence upwardly through the lower cooling chamber and terminating at their upper ends below the second-named partition, a suction chamber in the casing between the outlet and the upper cooling chamber, and means for drawing fumes into said suction chamber through the cooling chambers from the combustion chamber and discharging the fumes from the suction chamber through the outlet.

5. A fumigator comprising a casing having a combustion chamber at the bottom thereof and an outlet at the top thereof, a pair of cooling chambers arranged in successive order in said casing above said combustion chamber, a partition between the combustion chamber and lower cooling chamber, a partition between the cooling chambers having an opening therein, conducting tubes extending at their lower ends into the combustion chamber through the first-named partition and thence upwardly through the lower cooling chamber and terminating at their upper ends below the second-named partition, an annular dam wall surrounding the opening in the upper partition and extending therefrom upwardly into the upper cooling chamber, a suction chamber in the casing between the outlet and the upper cooling chamber, and means for drawing fumes into said suction chamber through the cooling chambers from the combustion chamber and discharging the fumes from the suction chamber through the outlet.

6. A fumigator comprising a casing, a combustion chamber at the base of the casing, cooling and suction chambers arranged in the casing above the combustion chamber in successive order and in superposed relation to each other, a horizontal partition between the combustion and cooling chambers, conducting tubes extending through said partition for the flow therethrough of fumes from the combustion chamber to the cooling chamber, an apertured partition between the cooling chamber and the suction chamber, an outlet at the top of the chamber, and a suction device supported by said apertured partition and operative for drawing the fumes upwardly through the aperture in the partition from the cooling chamber to the suction chamber and discharging the fumes through said outlet.

7. A fumigator comprising a casing having a combustion chamber at the bottom thereof and an outlet at the top thereof, a pair of cooling chambers arranged in successive order in said casing above said combustion chamber, a partition between the combustion chamber and lower cooling chamber, a partition between the cooling chambers having an opening therein, conducting tubes extending at their lower ends into the combustion chamber through the first-named partition and thence upwardly through the lower cooling chamber and terminating at their upper ends below the second-named partition, an annular dam wall surrounding the opening in the upper partition and extending therefrom upwardly into the upper cooling chamber, a screen across the opening in the dam wall, a suction chamber communicating with the upper cooling chamber, and means for drawing fumes into the suction chamber through the cooling chambers from the combustion chamber and discharging the fumes from the suction chamber.

8. A fumigator comprising a casing having a combustion chamber at the bottom thereof and an outlet at the top thereof, cooling and suction chambers arranged in successive order in said casing above said combustion chamber, a partition between the combustion chamber and cooling chamber, an apertured partition between the cooling chamber and suction chamber, tubes extending through the first-named partition and connecting the combustion chamber with the cooling chamber, a motor supported by the apertured partition, and a suction and discharge fan operated by the motor and disposed within the aperture in the second-named partition for drawing air from the cooling chamber and forcing the same into the suction chamber and through the outlet.

9. A fumigator comprising a casing having a combustion chamber at the bottom thereof and an outlet at the top thereof, a pair of cooling chambers arranged in successive order in said casing above said combustion chamber, a partition between the combustion chamber and lower cooling chamber, a partition between the cooling chambers having an opening therein, conducting tubes extending through the first-named partition and connecting the combustion chamber with the lower cooling chamber, a suction chamber in the casing between the outlet and the upper cooling chamber, an apertured partition between said suction chamber and the upper cooling chamber, a motor supported by said apertured partition, and a suction and discharge fan driven by said motor and operating in the aperture in said partition for drawing fumes from the upper combustion chamber through the aperture and into the suction chamber and discharging the same from said suction chamber through the outlet.

In testimony whereof I affix my signature.

ARTHUR LAFAYETTE.